(12) United States Patent
Jeong et al.

(10) Patent No.: US 9,910,328 B2
(45) Date of Patent: Mar. 6, 2018

(54) PIXEL ARRAY OF LIQUID CRYSTAL DISPLAY

(71) Applicant: LG DISPLAY CO., LTD., Seoul (KR)

(72) Inventors: Youngmin Jeong, Paju-si (KR); Wonho Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 295 days.

(21) Appl. No.: 14/752,422

(22) Filed: Jun. 26, 2015

(65) Prior Publication Data

US 2016/0018709 A1    Jan. 21, 2016

(30) Foreign Application Priority Data

Jul. 15, 2014  (KR) .................. 10-2014-0089363

(51) Int. Cl.
  *G02F 1/1362* (2006.01)
  *G02F 1/1333* (2006.01)
  *G02F 1/1343* (2006.01)

(52) U.S. Cl.
  CPC .............. *G02F 1/136213* (2013.01)

(58) Field of Classification Search
  None
  See application file for complete search history.

(56) References Cited

U.S. PATENT DOCUMENTS

| | | | |
|---|---|---|---|
| 5,668,613 A * | 9/1997 | Kim ............ | G02F 1/136213 349/38 |
| 2006/0193170 A1* | 8/2006 | Murade ............ | G09G 3/3648 365/185.03 |
| 2012/0161137 A1* | 6/2012 | Lee ............ | H01L 27/1255 257/59 |
| 2016/0026051 A1* | 1/2016 | Sasaki ............ | G02F 1/133345 349/43 |

FOREIGN PATENT DOCUMENTS

| | | |
|---|---|---|
| CN | 102566172 A | 7/2012 |
| EP | 0 435 101 A1 * | 7/1991 |
| EP | 0435101 A1 | 7/1991 |
| EP | 0514029 A2 | 11/1992 |
| KR | 10-2008-0001542 A1 | 1/2008 |

* cited by examiner

*Primary Examiner* — Ryan Crockett
(74) *Attorney, Agent, or Firm* — Birch, Stewart, Kolasch & Birch, LLP

(57) ABSTRACT

A pixel array of a liquid crystal display is discussed. The pixel array can include a first pixel including a first pixel electrode charged to a first data voltage, an upper common electrode which is positioned opposite the first pixel electrode and forms an electric field, a lower common electrode applying a common voltage to the upper common electrode, and a first storage capacitor for holding the first data voltage during a predetermined period, and a second pixel including a second pixel electrode charged to a second data voltage, the upper common electrode, the lower common electrode, and a second storage capacitor for holding the second data voltage during a predetermined period. The first and second storage capacitors are located in a storage area between the first and second pixels, which are positioned adjacent to each other in a horizontal direction.

15 Claims, 13 Drawing Sheets

PIXEL ARRAY OF LIQUID CRYSTAL DISPLAY

This application claims the priority benefit of Korean Patent Application No. 10-2014-0089363 filed on Jul. 15, 2014, which is incorporated herein by reference for all purposes as if fully set forth herein.

BACKGROUND OF THE INVENTION

Field of the Invention

Embodiments of the invention relate to a pixel array of a liquid crystal display.

Discussion of the Related Art

A display device has rapidly changed from a large-sized cathode ray tube (CRT) to a flat panel display (FPD) having advantages of thin profile, lightness in weight, and large-scale screen. Examples of the flat panel display include a liquid crystal display (LCD), a plasma display panel (PDP), an organic light emitting diode (OLED) display, and an electrophoresis display (EPD). Among the flat panel displays, the liquid crystal display displays an image by controlling an electric field applied to liquid crystal molecules based on a data voltage. An active matrix liquid crystal display reduces the manufacturing cost and improves performance due to the development of process technology and driving technology. Hence, the active matrix liquid crystal display is applied to many display devices from a small-sized mobile device to a large-sized television and has been widely used.

As shown in FIG. 1, a liquid crystal display according to a related art includes pixels respectively formed at crossings of data lines DL and gate lines GL. Each pixel may include a pixel electrode UPXL, an upper common electrode UCOM which is positioned opposite the pixel electrode UPXL and forms a liquid crystal driving electric field, a lower common electrode DCOM contacting the upper common electrode UCOM, and a thin film transistor (TFT) turning on an electric current flowing between the data line DL and the pixel electrode UPXL in response to a gate pulse (or scan pulse) from the gate line GL. A data voltage is applied to the data line DL, and a common voltage is applied to the lower common electrode DCOM. The pixel electrode UPXL is connected to a drain electrode (or a source electrode) of the TFT through a contact hole CT and receives the data voltage on the data line DL applied through the TFT. The upper common electrode UCOM is connected to the lower common electrode DCOM through a contact hole (not shown) and receives the common voltage from the lower common electrode DCOM.

Each TFT maintains an On-state only during a portion (for example, one horizontal period) (hereinafter referred to as "charging period") of one frame and maintains an Off-state during a remaining period of the one frame. Thus, each pixel includes a storage capacitor, so that the data voltage charged to the pixel electrode UPXL during the charging period is held during the remaining period. One electrode of the storage capacitor has to be connected to the pixel electrode UPXL, and the other electrode of the storage capacitor has to be connected to the upper or lower common electrode UCOM or DCOM, so as to hold the data voltage.

For this, as shown in FIGS. 1 and 2, in the related art liquid crystal display, a storage capacitor Cst using a drain electrode MPXL of the TFT connected to the pixel electrode UPXL as one electrode and the lower common electrode DCOM as the other electrode is formed near the gate line GL. In FIG. 2, "GLS" denotes a substrate, "GI" denotes a gate insulating layer, and "PAS" denotes an inorganic insulating layer.

A capacitance of the storage capacitor Cst is proportional to an overlap area between the both electrodes constituting the storage capacitor Cst and is inversely proportional to a separation distance between the both electrodes of the storage capacitor Cst. The capacitance of the storage capacitor Cst may vary depending on a parasitic capacitance, which is necessarily generated in a process of the storage capacitor Cst. In this example, the parasitic capacitance is generated between the both electrodes constituting the storage capacitor Cst and another electrode not used to constitute the storage capacitor Cst. For example, there are a parasitic capacitance Cgd between the gate line GL and the drain electrode MPXL of the TFT, a parasitic capacitance Cgs between the gate line GL and the source electrode of the TFT, etc. Because a voltage hold strength of the storage capacitor Cst is reduced when an influence of the parasitic capacitance increases, an area of the storage capacitor Cst has to increase so as to obtain the desired voltage hold strength.

Because the related art liquid crystal display includes the storage capacitor Cst formed near the gate line GL, the voltage hold strength of the storage capacitor Cst is reduced due to the gate line GL. The related art liquid crystal display includes the storage capacitor Cst formed with the large area to compensate for a reduction in the voltage hold strength, but this leds to a reduction in the aperture ratio of the display.

SUMMARY OF THE INVENTION

Embodiments of the invention provide a pixel array of a liquid crystal display capable of minimizing a reduction in an aperture ratio resulting from a storage capacitor.

In one aspect, there is a pixel array of a liquid crystal display comprising a first pixel including a first pixel electrode charged to a first data voltage, an upper common electrode which is positioned opposite the first pixel electrode and forms an electric field, a lower common electrode applying a common voltage to the upper common electrode, and a first storage capacitor for holding the first data voltage during a predetermined period; and a second pixel including a second pixel electrode charged to a second data voltage, the upper common electrode which is positioned opposite the second pixel electrode and forms the electric field, the lower common electrode applying the common voltage to the upper common electrode, and a second storage capacitor for holding the second data voltage during a predetermined period, wherein the first and second storage capacitors are located in a storage area between the first and second pixels, which are positioned adjacent to each other in a horizontal direction, and wherein a gate line and a data line for driving the first and second pixels are located in an area other than the storage area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
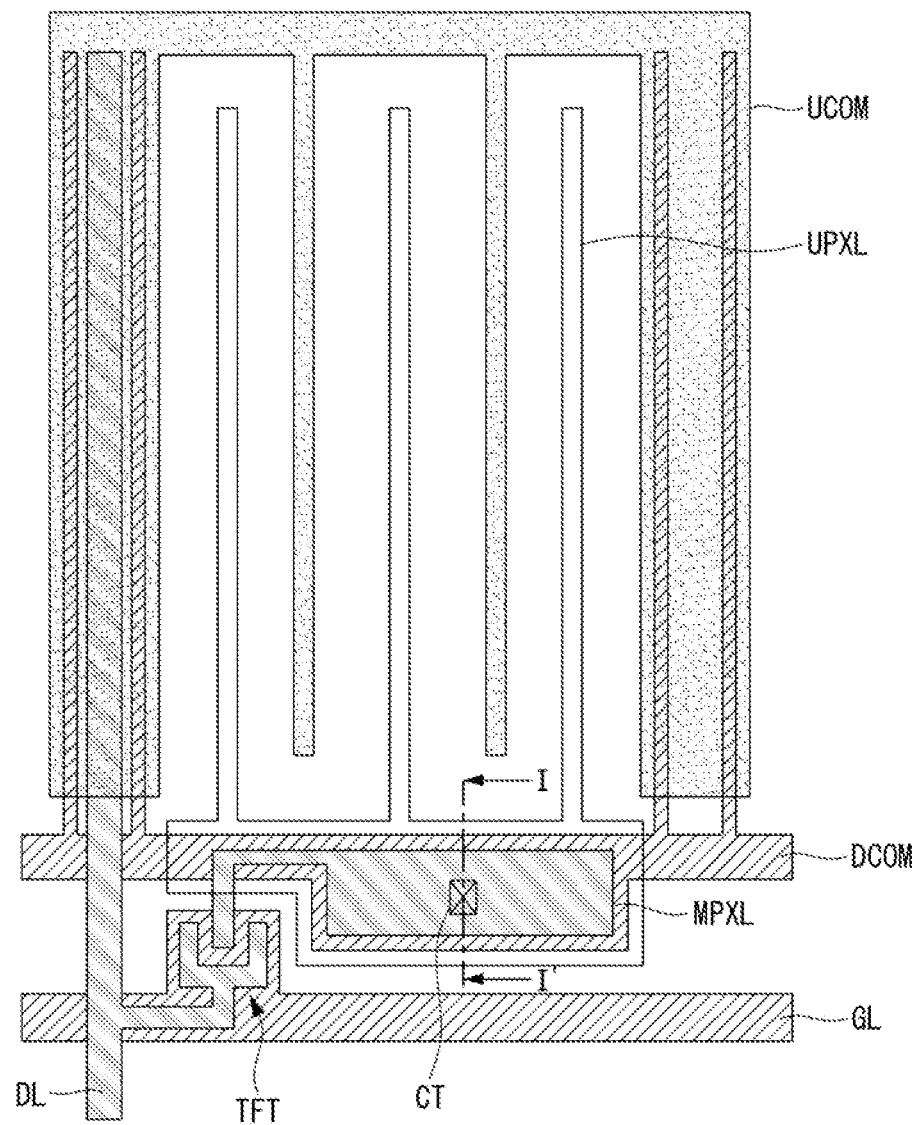
FIG. 1 shows a plane array of one pixel in a related art liquid crystal display.
Figure 2:
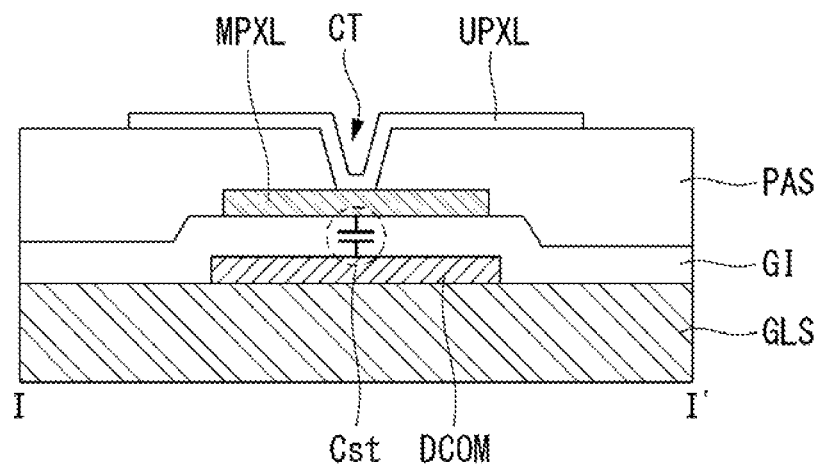
FIG. 2 is a cross-sectional view taken along line IT of FIG. 1.
Figure 3:
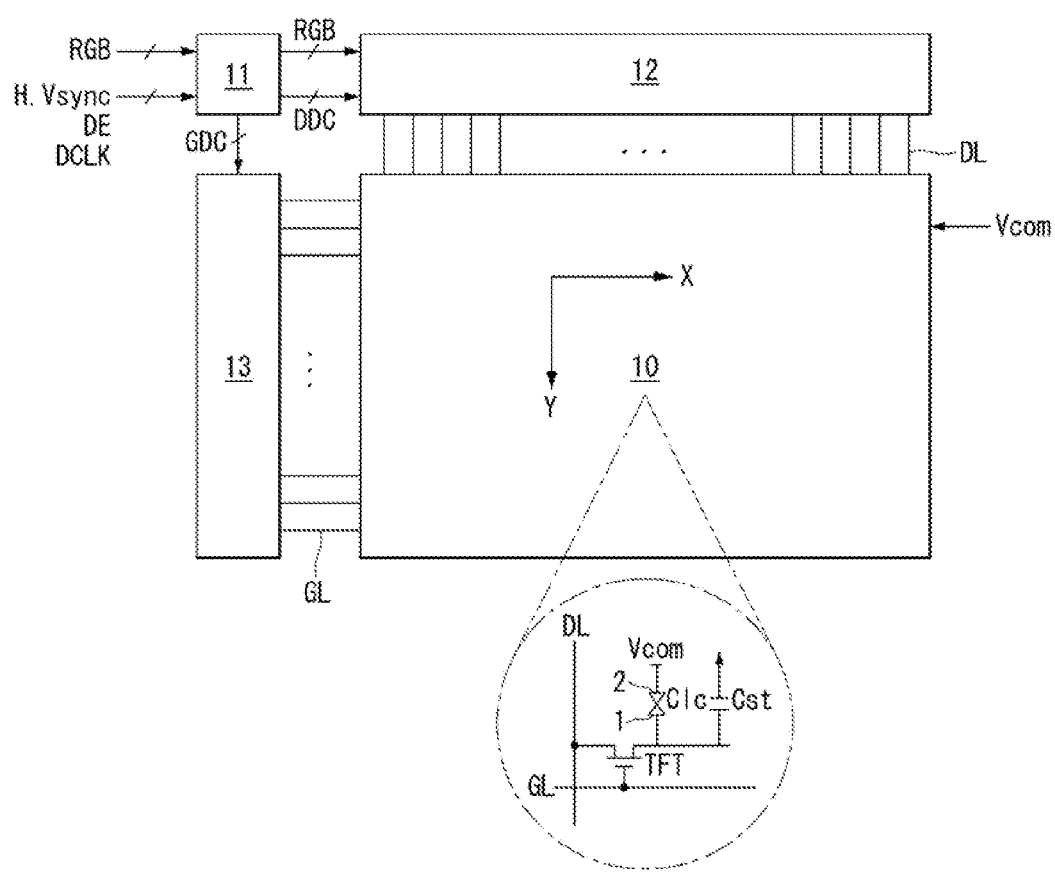
FIG. 3 shows a liquid crystal display according to an embodiment of the invention.
Figure 4:
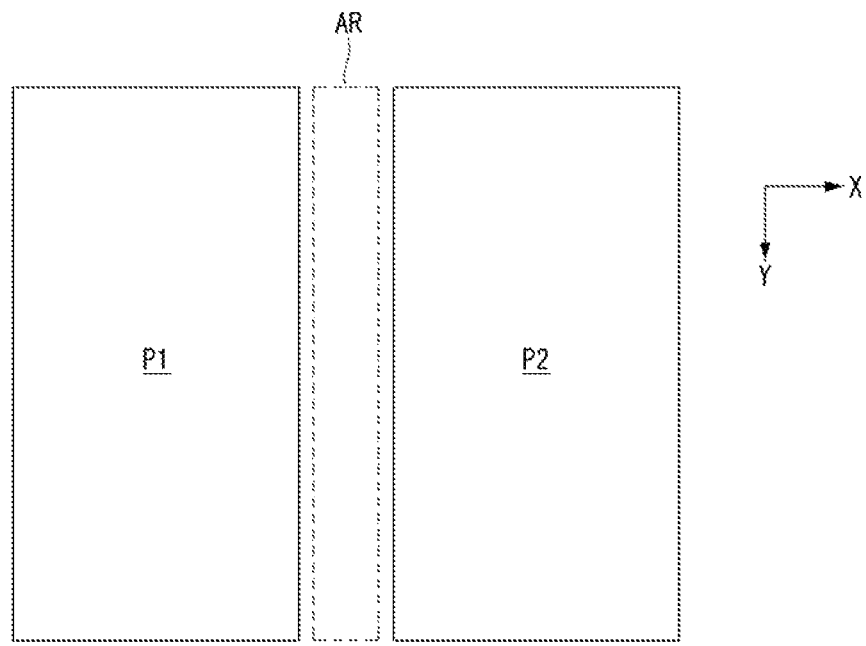
FIG. 4 shows a formation area of a storage capacitor according to an embodiment of the invention.
Figure 5A:
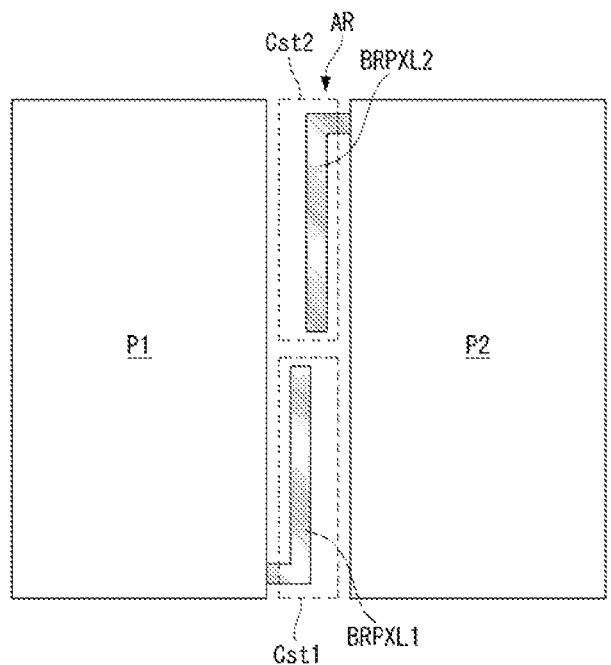
FIGS. 5A and 5B show examples of forming a branch pixel electrode functioning as one electrode of a storage capacitor according to an embodiment of the invention.
Figure 5B:
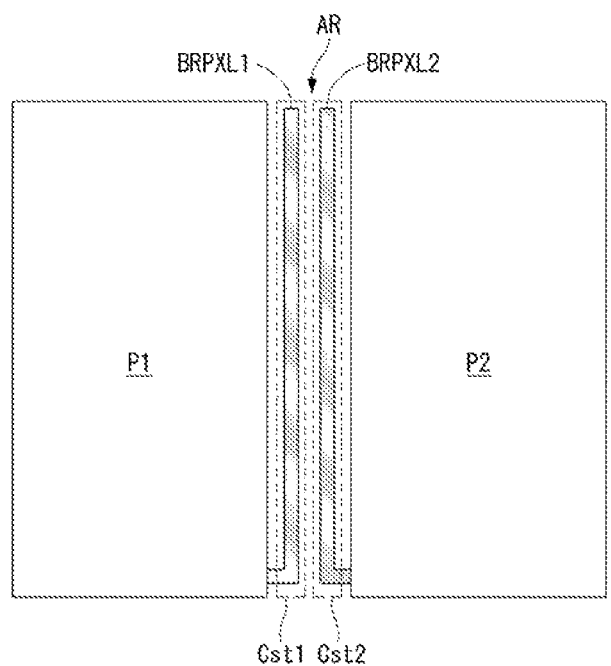

FIG. 3 shows a liquid crystal display according to an embodiment of the invention. FIG. 4 shows a formation area of a storage capacitor according to an embodiment of the invention. FIGS. 5A and 5B show examples of forming a branch pixel electrode functioning as one electrode of a storage capacitor.

Referring to FIGS. 3 and 4, the liquid crystal display according to the embodiment of the invention includes a liquid crystal display panel 10, a timing controller 11, a data driving circuit 12, and a gate driving circuit 13. All the components of the liquid crystal display in this and other embodiments are operatively coupled and configured.

The liquid crystal display according to the embodiment of the invention may be implemented in any known liquid crystal mode including a twisted nematic (TN) mode, a vertical alignment (VA) mode, an in-plane switching (IPS) mode, a fringe field switching (FFS) mode, etc. The liquid crystal display according to the embodiment(s) of the invention may be implemented as any type liquid crystal display including a transmissive liquid crystal display, a transflective liquid crystal display, a reflective liquid crystal display, etc.

The liquid crystal display panel 10 includes an upper substrate and a lower substrate, which are positioned opposite each other with liquid crystal cells Clc interposed therebetween. Video data is displayed on a pixel array of the liquid crystal display panel 10 including pixels arranged in a matrix form. The pixel array includes a thin film transistor (TFT) array formed on the lower substrate of the liquid crystal display panel 10 and a color filter array formed on the upper substrate of the liquid crystal display panel 10. Color filters may be formed on the TFT array of the lower substrate using a COT (color filter on TFT) process.

The TFT array includes vertical lines and horizontal lines. The vertical lines are formed along a vertical direction (i.e., a Y-axis direction of FIG. 3) of the liquid crystal display panel 10. The horizontal lines are formed along a horizontal direction (i.e., an X-axis direction of FIG. 3) of the liquid crystal display panel 10 and are perpendicular to the vertical lines. The vertical lines include data lines DL, and the horizontal lines include gate lines GL.

A thin film transistor (TFT) is formed at each crossing of the data lines DL and the gate lines GL of the TFT array. The TFT supplies a data voltage from the data line DL to a pixel electrode 1 of the liquid crystal cell Clc in response to a gate pulse from the gate line GL. Each liquid crystal cell Clc functioning as the pixel is driven by a voltage difference between the pixel electrode 1 charged to the data voltage through the TFT and a common electrode 2, to which the common voltage Vcom is applied. The common voltage Vcom is applied to the common electrode 2 of the pixels through common voltage supply lines. The common electrode 2 may be implemented as an upper common electrode UCOM (refer to FIGS. 9 and 13) which is positioned opposite the pixel electrode 1 on the same level layer. The common voltage supply line may be configured to include a lower common electrode DCOM (refer to FIGS. 9, 13 and 15) formed in a direction parallel to the gate line GL on the same level layer. Or, the common voltage supply line may be configured to further include a middle common electrode MCOM (refer to FIGS. 13 and 15) formed in a direction parallel to the data line DL on the same level layer.

A storage capacitor Cst is connected to each liquid crystal cell Clc and uniformly holds the data voltage charged to the pixel during one frame period. The color filter array includes color filters and black matrixes. Polarizing plates are respectively attached to the upper substrate and the lower substrate of the liquid crystal display panel 10. Alignment layers for setting a pre-tilt angle of liquid crystals are respectively formed on the upper substrate and the lower substrate of the liquid crystal display panel 10.

As shown in FIG. 4, the storage capacitor Cst is formed a storage area AR between two pixels P1 and P2, which are positioned adjacent to each other in the horizontal direction (i.e., the X-axis direction), so as to minimize a reduction in an aperture ratio while securing a desired voltage hold strength. A gap area exists between every two pixels, which are positioned adjacent to each other in the horizontal direction (i.e., the X-axis direction). The storage area AR according to the embodiment(s) of the invention does not indicate all of the gap areas and indicates only the gap areas, in which the data lines DL and the gate lines GL are not formed among the gap areas. Examples of the pixel array having the storage area AR are described later through FIGS. 6 to 8.

The liquid crystal display according to the embodiment(s) of the invention forms the storage capacitor Cst in the storage area AR farthest from the data lines DL and the gate lines GL, thereby minimizing an influence of a parasitic capacitance due to the signal lines DL and GL. As a result, a formation area (i.e., an overlap area between electrodes for forming the storage capacitor) of the storage capacitor Cst according to the embodiment(s) of the invention is less than a formation area of a related art storage capacitor under the condition of the same capacitance. Hence, an improvement of an aperture ratio may be easily achieved by the embodiments of the invention.

Figure 9:
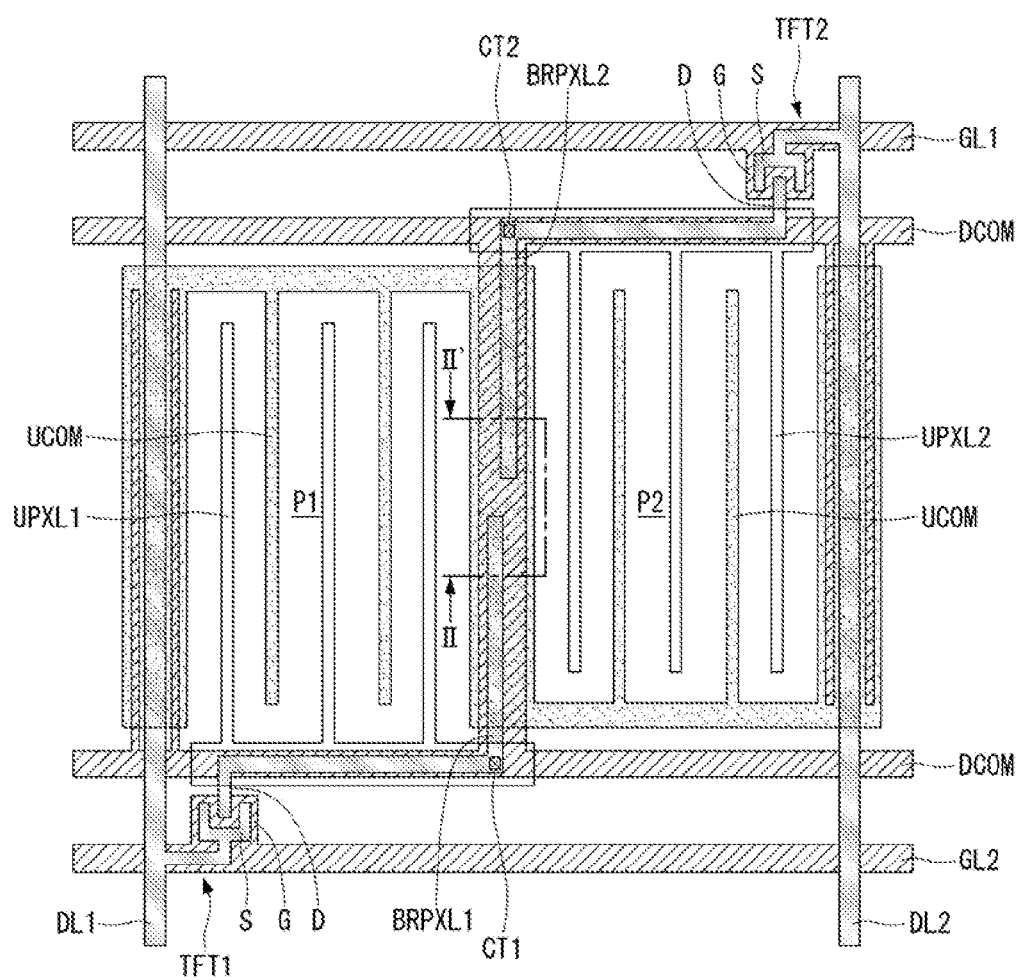
FIG. 9 shows a detailed plane array of a portion XY of FIG. 6.
Figure 10:
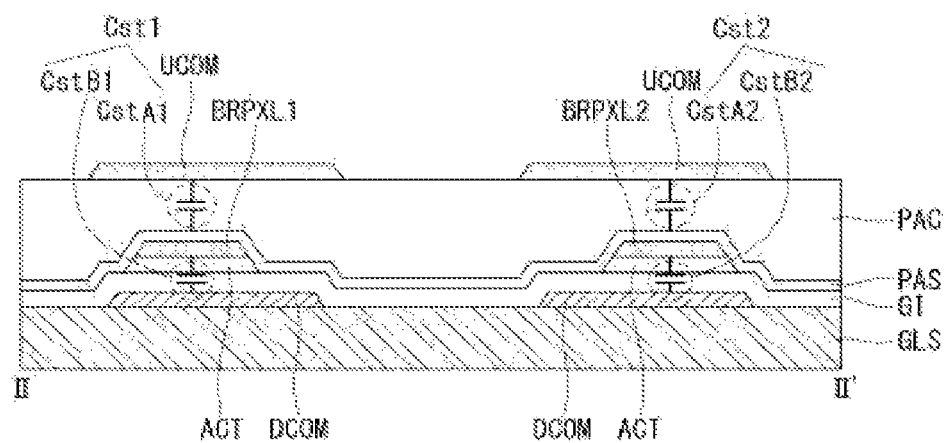
FIG. 10 is a cross-sectional view taken along line II-IF of FIG. 9.

As shown in FIGS. 9 and 10, regarding the liquid crystal display according to the embodiment(s) of the invention forming the storage capacitor Cst in the storage area AR, the display forms both storage capacitors CstA and CstB using the upper common electrode UCOM and the lower common electrode DCOM respectively formed on and under a branch pixel electrode BRPXL branching out from the pixel electrode, thereby increasing a capacitance of the storage capacitor Cst. Further, the embodiment(s) of the invention may reduce the formation area of the storage capacitor Cst in consideration of the increased capacitance of the storage capacitor Cst, thereby further improving the aperture ratio. In this instance, the embodiment(s) of the invention may divide at least one of the upper common electrode UCOM and the lower common electrode DCOM into two or more electrode patterns, so as to easily adjust the capacitance of the storage capacitor Cst.

As shown in FIGS. 13 to 16, when the liquid crystal display according to the embodiment(s) of the invention is implemented to further include the middle common electrode MCOM in the storage area AR so as to stabilize the common voltage Vcom, the storage capacitor Cst formed in the storage area AR may use the branch pixel electrode BRPXL branching out from the pixel electrode and the middle common electrode MCOM as both electrodes of the storage capacitor Cst. Hence, it is very advantageous to secure the aperture ratio.

The branch pixel electrode BRPXL functioning as one electrode of the storage capacitor Cst according to the embodiment(s) of the invention is positioned close to a pixel, to which the branch pixel electrode BRPXL belongs, so that the branch pixel electrode BRPXL is least affected by an electric field of an adjacent pixel. Hence, the voltage hold strength may greatly increase. For example, as shown in FIG. 5A, a first branch pixel electrode BRPXL1 branching out from a first pixel P1 may be positioned closer to the first pixel P1 than to a second pixel P2, and a second branch pixel electrode BRPXL2 branching out from the second pixel P2 may be positioned closer to the second pixel P2 than to the first pixel P1. Further, as shown in FIG. 5B, a first branch pixel electrode BRPXL1 branching out from a first pixel P1 may be positioned closer to the first pixel P1 than to a second pixel P2, and a second branch pixel electrode BRPXL2 branching out from the second pixel P2 may be positioned closer to the second pixel P2 than to the first pixel P1. In FIGS. 5A and 5B, a branching position of the branch pixel electrode is determined depending on a disposition position of the TFT. More specifically, FIG. 5A may correspond to a pixel array shown in FIGS. 6 and 12, and FIG. 5B may correspond to a pixel array shown in FIGS. 7 and 8.

The data driving circuit 12 includes a plurality of source driver integrated circuits (ICs). Each source driver IC samples and latches digital video data RGB of an input image under the control of the timing controller 11 and converts the digital video data RGB into parallel data. The source driver IC converts the digital video data RGB into analog gamma compensation voltages using a digital-to-analog converter (DAC) under the control of the timing controller 11 and generates the data voltage. The source driver IC then supplies the data voltage to the data line DL.

The gate driving circuit 13 supplies the gate pulse (or scan pulse) synchronized with the data voltage to the gate lines GL in a sequential line manner under the control of the timing controller 11. The gate driving circuit 13 may be directly formed on the liquid crystal display panel 10 through a gate driver-in panel (GIP) method.

The timing controller 11 transmits the digital video data RGB of the input image received from a host system to the source driver ICs. The timing controller 11 receives timing signals, such as a vertical sync signal Vsync, a horizontal sync signal Hsync, a data enable signal DE, and a main clock DCLK, from the host system. The timing signals are synchronized with the digital video data RGB of the input image. The timing controller 11 generates a source timing control signal for controlling operation timing of the data driving circuit 12 and a gate timing control signal for controlling operation timing of the gate driving circuit 13 using the timing signals Vsync, Hsync, DE, and DCLK.

The host system may be implemented as one of a television system, a set-top box, a navigation system, a DVD player, a Blu-ray player, a personal computer (PC), a home theater system, and a phone system. The host system converts the digital video data RGB of the input image into a format suitable for the liquid crystal display panel 10. The host system transmits the digital video data RGB of the input image and the timing signals Vsync, Hsync, DE, and DCLK to the timing controller 11.

Figure 6:
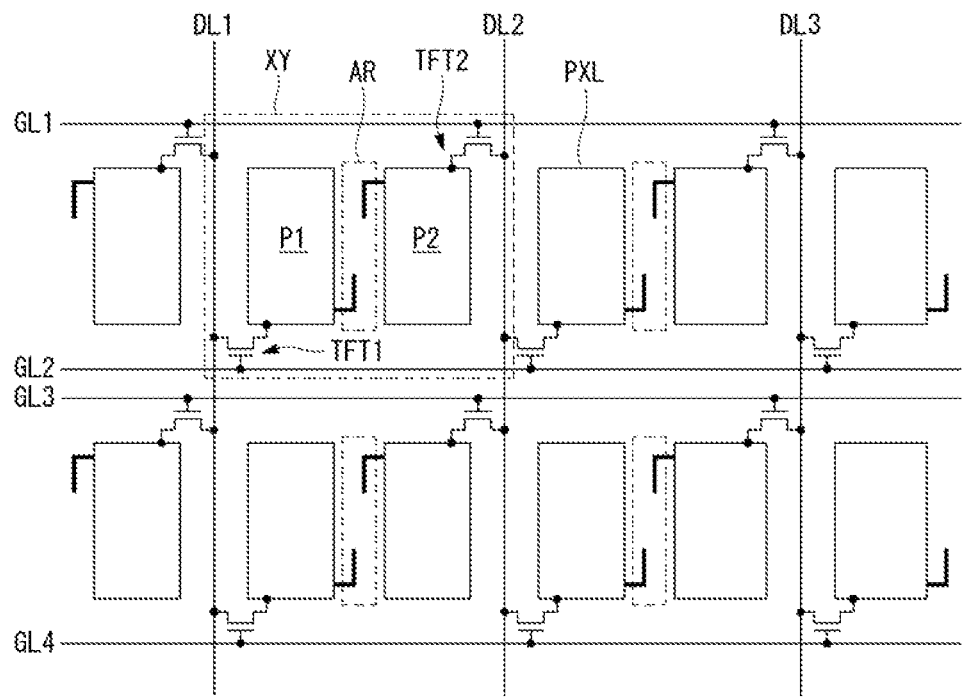
FIGS. 6 to 8 show examples of a pixel array, in which a storage capacitor according to an embodiment of the invention is formed.
Figure 7:
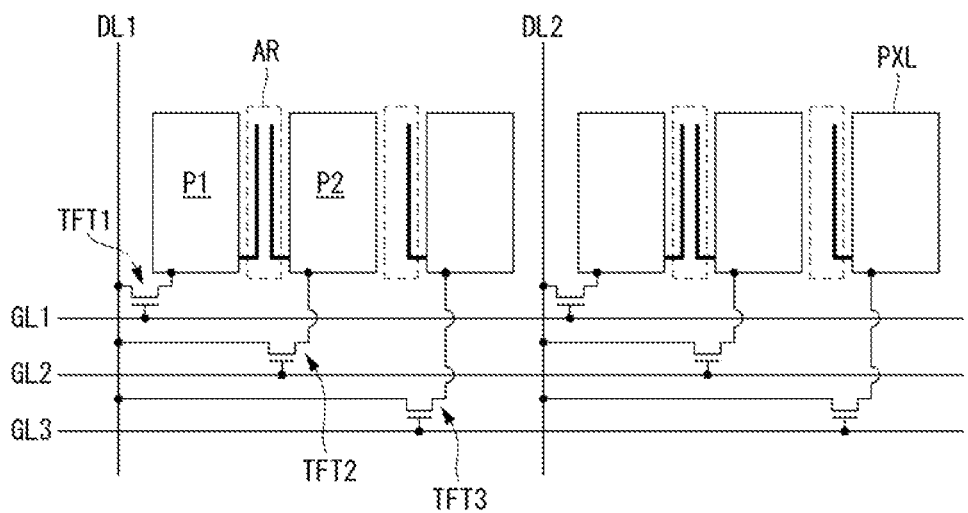
Figure 8:
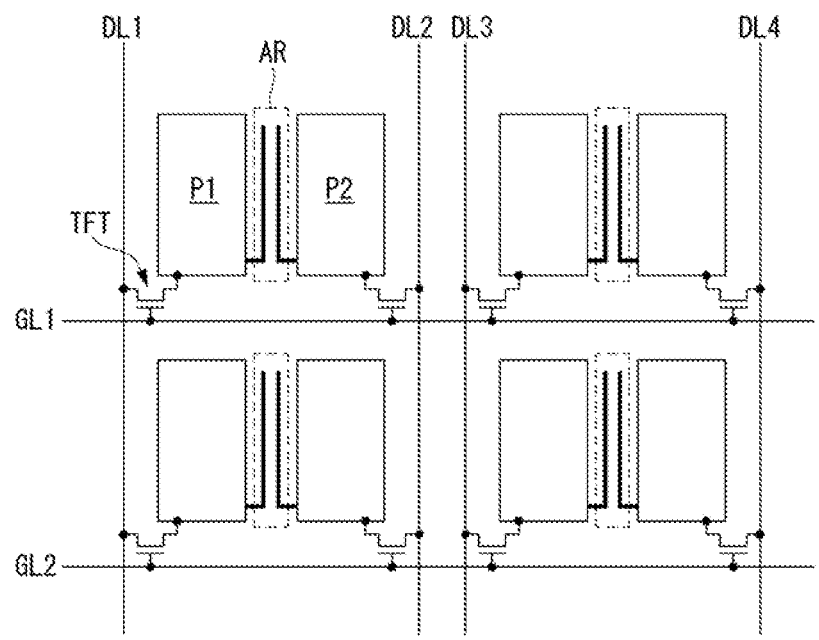

FIGS. 6 to 8 show examples of a pixel array, in which the storage capacitor according to the embodiment(s) of the invention is formed. The embodiments of the invention may use the pixel array shown in FIGS. 6 to 8 so as to secure the storage area AR, in which the storage capacitor is formed.

Referring to FIG. 6, the pixel array according to the embodiment(s) of the invention may reduce the number of data lines to one half of the number of pixels for implementing a fixed horizontal resolution and also may reduce the required number of source driver ICs to one half. However, the pixel array of FIG. 6 has to increase the number of gate lines two times the number of pixels for implementing a fixed vertical resolution, instead of reducing the number of data lines to one half.

In the pixel array of FIG. 6, each of a plurality of pairs of pixels, which are positioned adjacent to each other in the horizontal direction (i.e., the X-axis direction), share the same data line with each other and are successively charged to the data voltage supplied through the same data line in a time-division manner. A TFT2 is turned on in response to a scan pulse from a first gate line GL1. Hence, the TFT2 electrically connects data lines DL1 to DL3 to the pixels P2 disposed on the left sides of the data lines DL1 to DL3 and supplies the data voltage to the corresponding pixels. A TFT1 is turned on in response to a scan pulse from a second gate line GL2. Hence, the TFT1 electrically connects the data lines DL1 to DL3 to the pixels P1 disposed on the right sides of the data lines DL1 to DL3 and supplies the data voltage to the corresponding pixels.

In the pixel array of FIG. 6, the storage area AR exists between the pairs of pixels, and the gate line and the data line are not formed in the storage area AR. The embodiment(s) of the invention include branch pixel electrodes respectively branching out from the pixels P1 and P2, which are positioned adjacent to each other in the horizontal direction (i.e., the X-axis direction) with the storage area AR interposed therebetween, so as to form the storage capacitor in the storage area AR. The branch pixel electrode is used as one electrode of the storage capacitor.

Further, referring to FIG. 7, the pixel array according to the embodiment(s) of the invention may reduce the number of data lines to ⅓ of the number of pixels for implementing the fixed horizontal resolution and also may reduce the required number of source driver ICs to ⅓. However, the pixel array of FIG. 7 has to increase the number of gate lines three times the number of pixels for implementing the fixed vertical resolution, instead of reducing the number of data lines to ⅓.

In the pixel array of FIG. 7, in a plurality of pixel groups each including three pixels, which are positioned adjacent to one another in the horizontal direction (i.e., the X-axis direction), the pixels of each pixel group share the same data line with one another and are successively charged to the data voltage supplied through the same data line in the time-division manner. A TFT1 is turned on in response to a scan pulse from a first gate line GL1. Hence, the TFT1 electrically connects a data line DL1 to a first pixel and supplies the data voltage to the first pixel. A TFT2 is turned on in response to a scan pulse from a second gate line GL2. Hence, the TFT2 electrically connects the data line DL1 to a second pixel and supplies the data voltage to the second pixel. A TFT3 is turned on in response to a scan pulse from a third gate line GL3. Hence, the TFT3 electrically connects the data line DL1 to a third pixel and supplies the data voltage to the third pixel.

In the pixel array of FIG. 7, the storage area AR exists between pixels P1 and P2 belonging to the same pixel group, and the gate line and the data line are not formed in the storage area AR. The embodiments of the invention include branch pixel electrodes respectively branching out from the pixels P1 and P2, which are positioned adjacent to each other in the horizontal direction (i.e., the X-axis direction) with the storage area AR interposed therebetween, so as to form the storage capacitor in the storage area AR. The branch pixel electrode is used as one electrode of the storage capacitor.

Further, referring to FIG. 8, the pixel array according to the embodiment(s) of the invention sets the number of data lines to be equal to the number of pixels for implementing the fixed horizontal resolution, but may secure the storage area AR by adjusting a formation position of the data lines. For example, in the pixel array of FIG. 8, odd-numbered data lines DL1 and DL3 are respectively formed on the left sides of pixels disposed on odd-numbered column lines, and even-numbered data lines DL2 and DL4 are respectively formed on the right sides of pixels disposed on even-numbered column lines.

Hence, in the pixel array of FIG. 8, the storage area AR exists between a pixel P1 of the odd-numbered column line and a pixel P2 of the even-numbered column line, which are positioned adjacent to each other in the horizontal direction, and the gate line and the data line are not formed in the storage area AR. The embodiments of the invention include branch pixel electrodes respectively branching out from the pixels P1 and P2, which are positioned adjacent to each other in the horizontal direction with the storage area AR interposed therebetween, so as to form the storage capacitor in the storage area AR. The branch pixel electrode is used as one electrode of the storage capacitor.

FIG. 9 shows an example where the storage capacitors are formed in the storage area AR. More specifically, FIG. 9 shows a detailed plane array of a portion XY of FIG. 6. FIG. 10 is a cross-sectional view taken along line II-IF of FIG. 9.

Figure 11A:
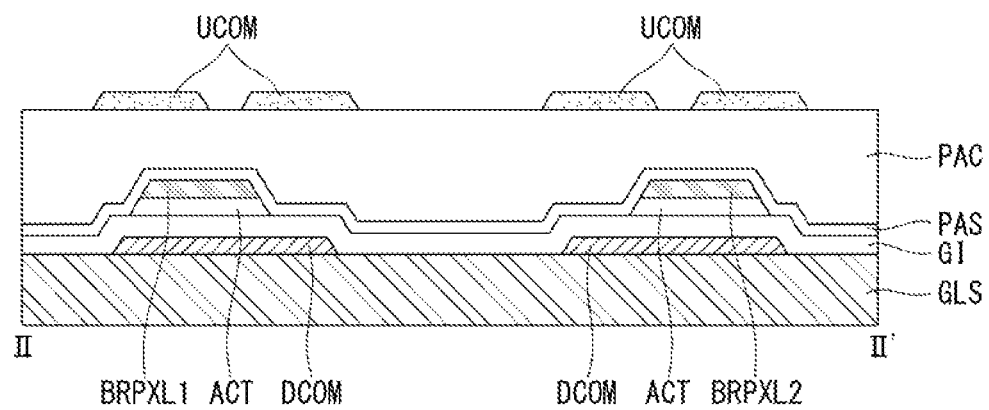
FIGS. 11A to 11C show examples of dividing an electrode for adjusting a capacitance of a storage capacitor according to an embodiment of the invention.
Figure 11B:
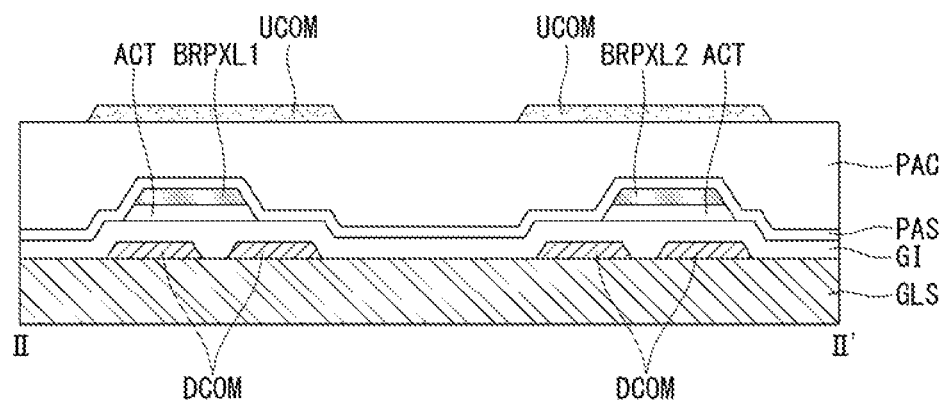
Figure 11C:
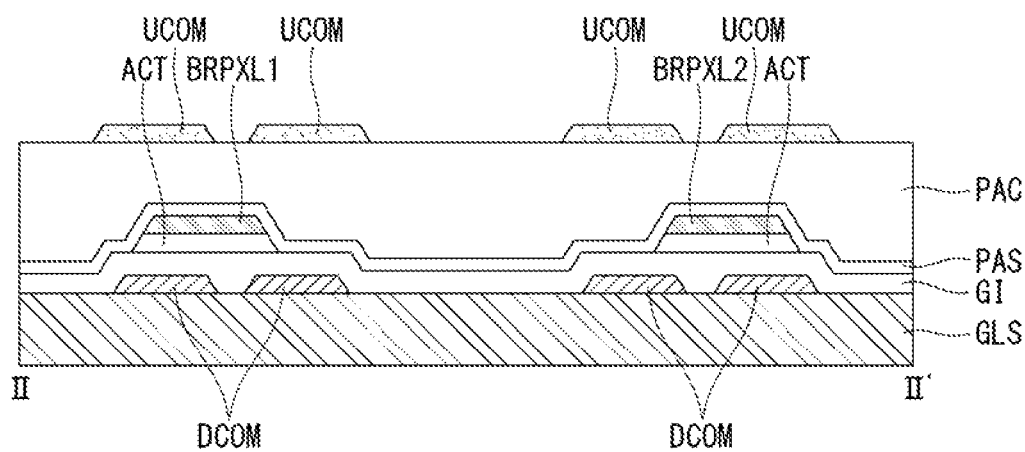

FIGS. 11A to 11C show examples of dividing an electrode for adjusting a capacitance of the storage capacitor.

Referring to FIGS. 9 and 10, a storage area AR is formed between a first pixel P1 and a second pixel P2, which are positioned adjacent to each other in the horizontal direction (i.e., the X-axis direction). In FIG. 10, "ACT" denotes a semiconductor pattern.

The first pixel P1 includes a first pixel electrode UPXL1 charged to a first data voltage, an upper common electrode UCOM which is positioned opposite the first pixel electrode UPXL1 and forms an electric field, a lower common electrode DCOM applying a common voltage to the upper common electrode UCOM, a first storage capacitor Cst1 for holding the first data voltage during a predetermined period (for example, one frame period), and a first TFT. The first TFT turns on an electric current flowing between a first data line DL1 and the first pixel electrode UPXL1 in response to a scan pulse from a second gate line GL2 and thus supplies the first data voltage of the first data line DL1 to the first pixel electrode UPXL1. The first TFT includes a gate electrode G integrated with the second gate line GL2, a drain electrode D integrated with the first data line DL1, and a source electrode S connected to the first pixel electrode UPXL1 through a first contact hole CT1.

The second pixel P2 includes a second pixel electrode UPXL2 charged to a second data voltage, the upper common electrode UCOM which is positioned opposite the second pixel electrode UPXL2 and forms an electric field, the lower common electrode DCOM applying the common voltage to the upper common electrode UCOM, a second storage capacitor Cst2 for holding the second data voltage during a predetermined period, and a second TFT. The second TFT turns on an electric current flowing between a second data line DL2 and the second pixel electrode UPXL2 in response to a scan pulse from a first gate line GL1 and thus supplies the second data voltage of the second data line DL2 to the second pixel electrode UPXL2. The second TFT includes a gate electrode G integrated with the first gate line GL1, a drain electrode D integrated with the second data line DL2, and a source electrode S connected to the second pixel electrode UPXL2 through a second contact hole CT2.

The first and second storage capacitors Cst1 and Cst2 are formed in the storage area AR between the first and second pixels P1 and P2, which are positioned adjacent to each other in the horizontal direction. The gate line and the data line for driving the first and second pixels P1 and P2 are not formed in the storage area AR. As a result, an influence of a parasitic capacitance due to the signal lines DL and GL is minimized, and capacitances of the first and second storage capacitors Cst1 and Cst2 substantially increase.

The lower common electrode DCOM may be formed using the same material and the same process as the gate lines GL1 and GL2 and the gate electrodes G of the TFTs. The lower common electrode DCOM may be formed in parallel with the gate lines GL1 and GL2 along the horizontal direction (i.e., the X-axis direction) and also may extend along the vertical direction (i.e., the Y-axis direction) in the storage area AR.

A first branch pixel electrode BRPXL1 in the storage area AR may be formed on the lower common electrode DCOM with a gate insulating layer GI interposed therebetween and may be formed under the upper common electrode UCOM with at least one of inorganic and organic insulating layers PAS and PAC interposed therebetween. A second branch pixel electrode BRPXL2 in the storage area AR may be formed on the lower common electrode DCOM with the gate insulating layer GI interposed therebetween and may be formed under the upper common electrode UCOM with the at least one of inorganic and organic insulating layers PAS and PAC interposed therebetween. The first and second branch pixel electrodes BRPXL1 and BRPXL2 may be formed using the same material and the same process as the data lines DL1 and DL2 and the source electrodes S and the drain electrodes D of the TFTs. The first branch pixel electrode BRPXL1 may be integrated with the drain electrode D of the first TFT and then may be connected to the first pixel electrode UPXL1 through the first contact hole CT1. The second branch pixel electrode BRPXL2 may be integrated with the drain electrode D of the second TFT and then may be connected to the second pixel electrode UPXL2 through the second contact hole CT2. The upper common electrode UCOM may be formed using the same material and the same process as the first and second pixel electrodes UPXL1 and UPXL2. The upper common electrode UCOM may be positioned opposite the first and second pixel electrodes UPXL1 and UPXL2 and also may extend along the vertical direction (i.e., the Y-axis direction) in the storage area AR.

Hence, the first storage capacitor Cst1 includes a first upper storage capacitor CstA1 using the first branch pixel electrode BRPXL1 and the upper common electrode UCOM as both electrodes and a first lower storage capacitor CstB1 using the first branch pixel electrode BRPXL1 and the lower common electrode DCOM as both electrodes and may be formed as a bidirectional storage capacitor. As a result, the capacitance of the first storage capacitor Cst1 may increase, and a formation area of the first storage capacitor Cst1 may decrease.

Further, the second storage capacitor Cst2 includes a second upper storage capacitor CstA2 using the second branch pixel electrode BRPXL2 and the upper common electrode UCOM as both electrodes and a second lower storage capacitor CstB2 using the second branch pixel electrode BRPXL2 and the lower common electrode DCOM as both electrodes and may be formed as a bidirectional storage capacitor. As a result, the capacitance of the second storage capacitor Cst2 may increase, and a formation area of the second storage capacitor Cst2 may decrease.

The first and second branch pixel electrodes BRPXL1 and BRPXL2 may be asymmetrically formed in the storage area AR, so as to maximally suppress an influence of an interference of an electric field applied from an adjacent pixel. In other words, the first branch pixel electrode BRPXL1 may be positioned closer to the first pixel electrode UPXL1 than to the second pixel electrode UPXL2, and the second branch pixel electrode BRPXL2 may be positioned closer to the second pixel electrode UPXL2 than to the first pixel electrode UPXL1.

Because each of the first and second storage capacitors Cst1 and Cst2 has a bidirectional structure, the capacitance of each of the first and second storage capacitors Cst1 and Cst2 may excessively increase. Thus, as shown in FIGS. 11A to 11C, the embodiments of the invention can easily adjust the capacitances of the first and second storage capacitors Cst1 and Cst2 by dividing at least one of the upper common electrode UCOM and the lower common electrode DCOM into two or more electrode patterns in the storage area AR.

Figure 12:
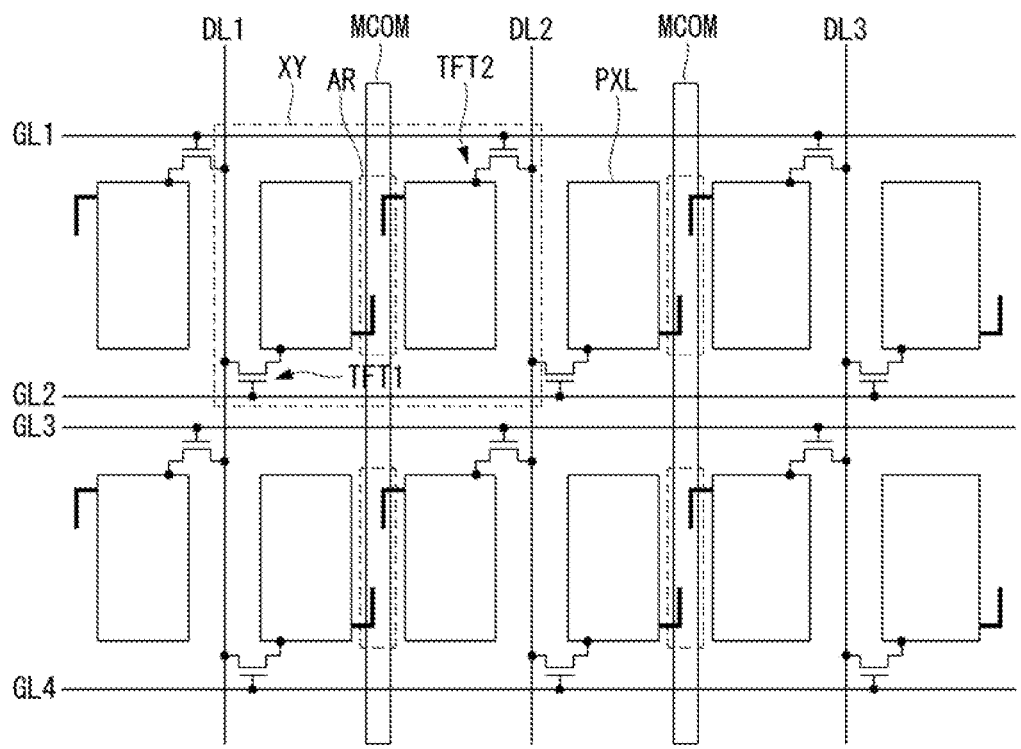
FIG. 12 shows another example of a pixel array, in which a storage capacitor according to an embodiment of the invention is formed.
Figure 13:
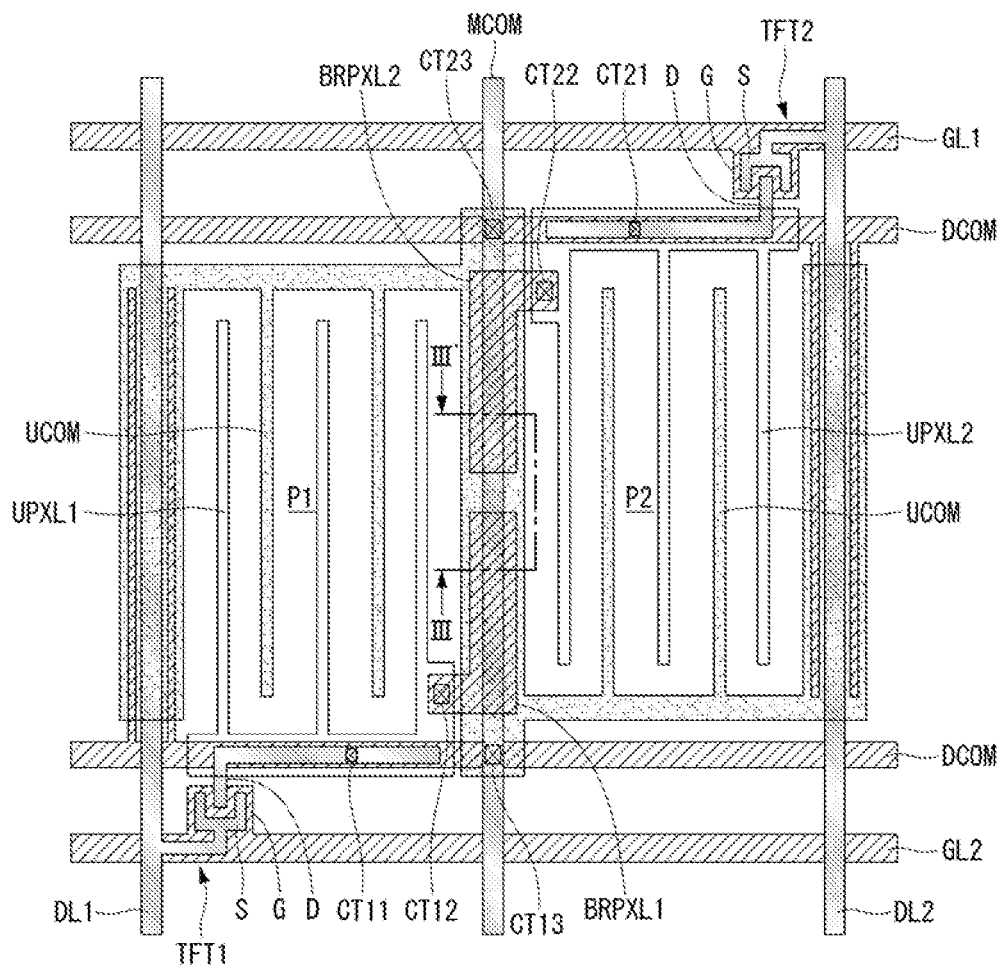
FIG. 13 shows an example of a detailed plane array of a portion XY of FIG. 12.
Figure 14:
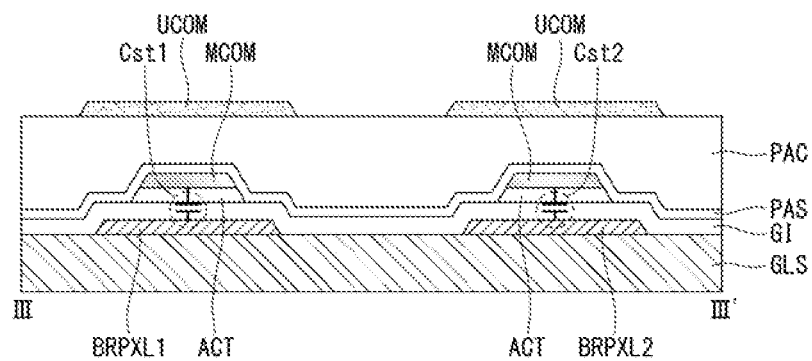
FIG. 14 is a cross-sectional view taken along line III-III' of FIG. 13.
Figure 15:
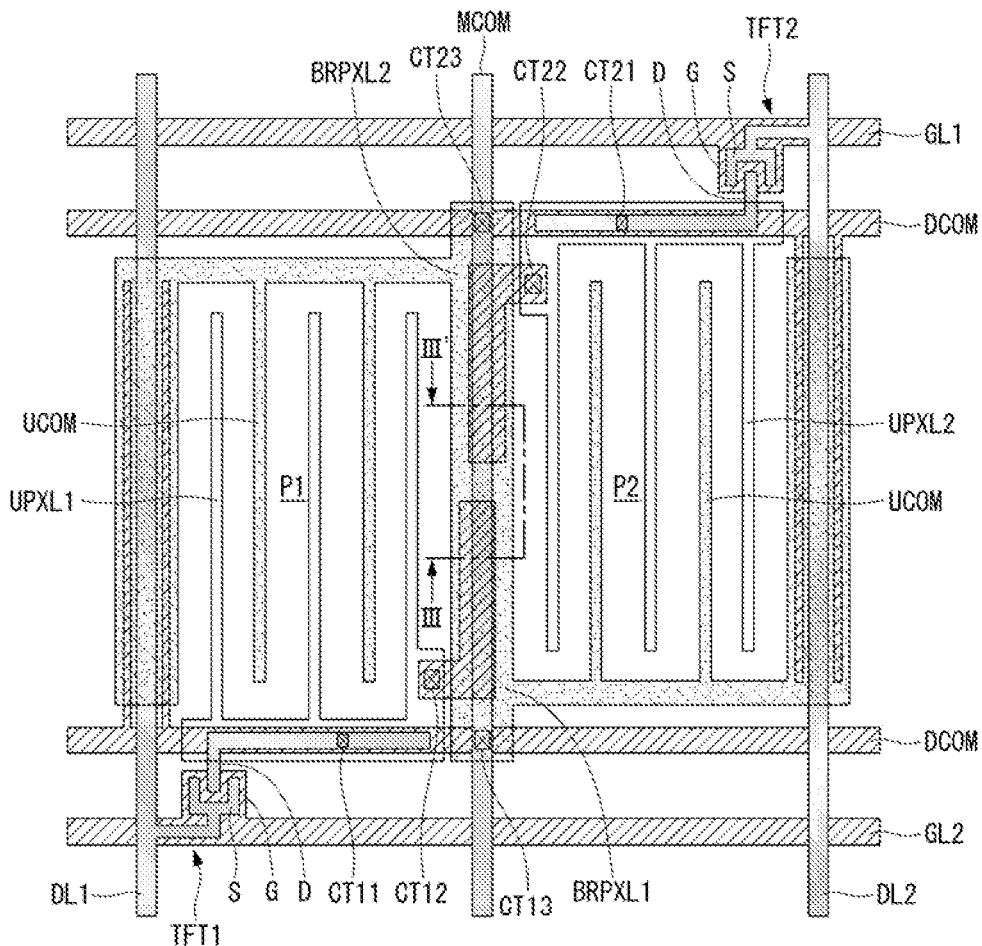
FIG. 15 shows a modified example of FIG. 13 according to an embodiment of the invention.
Figure 16:
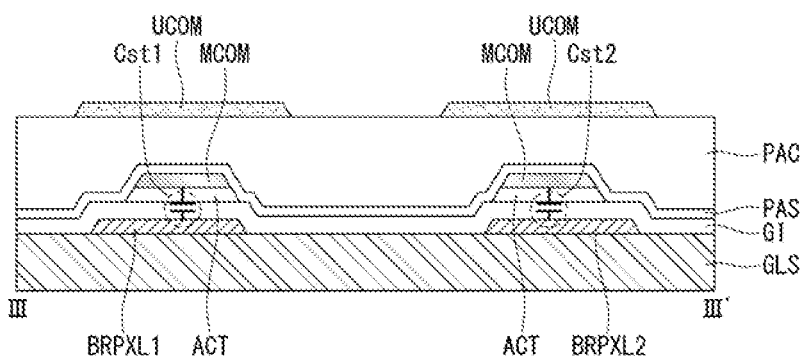
FIG. 16 is a cross-sectional view taken along line III-III' of FIG. 15.

FIG. 12 shows another example of a pixel array, in which a storage capacitor according to an embodiment of the invention is formed. FIG. 13 shows an example where the storage capacitors are formed in the storage area, and more specifically, shows a detailed plane array of a portion XY of FIG. 12. FIG. 14 is a cross-sectional view taken along line III-III' of FIG. 13. FIG. 15 shows a modified example of FIG. 13. FIG. 16 is a cross-sectional view taken along line III-III' of FIG. 15.

Referring to FIGS. 12 to 16, a storage area AR is formed between a first pixel P1 and a second pixel P2, which are positioned adjacent to each other in the horizontal direction (i.e., the X-axis direction). In FIGS. 14 and 16, "ACT" denotes a semiconductor pattern.

The first pixel P1 includes a first pixel electrode UPXL1 charged to a first data voltage, an upper common electrode UCOM which is positioned opposite the first pixel electrode UPXL1 and forms an electric field, a lower common electrode DCOM applying a common voltage to the upper common electrode UCOM, a first storage capacitor Cst1 for holding the first data voltage during a predetermined period (for example, one frame period), and a first TFT. The first TFT turns on an electric current flowing between a first data line DL1 and the first pixel electrode UPXL1 in response to a scan pulse from a second gate line GL2 and thus supplies the first data voltage of the first data line DL1 to the first pixel electrode UPXL1. The first TFT includes a gate electrode G integrated with the second gate line GL2, a drain electrode D integrated with the first data line DL1, and a source electrode S connected to the first pixel electrode UPXL1 through a 1-1 contact hole CT11.

The second pixel P2 includes a second pixel electrode UPXL2 charged to a second data voltage, the upper common electrode UCOM which is positioned opposite the second pixel electrode UPXL2 and forms an electric field, the lower common electrode DCOM applying the common voltage to the upper common electrode UCOM, a second storage capacitor Cst2 for holding the second data voltage during a predetermined period, and a second TFT. The second TFT turns on an electric current flowing between a second data line DL2 and the second pixel electrode UPXL2 in response to a scan pulse from a first gate line GL1 and thus supplies the second data voltage of the second data line DL2 to the second pixel electrode UPXL2. The second TFT includes a gate electrode G integrated with the first gate line GL1, a drain electrode D integrated with the second data line DL2, and a source electrode S connected to the second pixel electrode UPXL2 through a 2-1 contact hole CT21.

The first and second storage capacitors Cst1 and Cst2 are formed in the storage area AR between the first and second pixels P1 and P2, which are positioned adjacent to each other in the horizontal direction. The gate line and the data line for driving the first and second pixels P1 and P2 are not formed in the storage area AR. As a result, an influence of a parasitic capacitance due to the signal lines DL and GL is minimized, and capacitances of the first and second storage capacitors Cst1 and Cst2 substantially increase.

A middle common electrode MCOM, which is connected to the upper common electrode UCOM and the lower common electrode DCOM and extends along the vertical direction (i.e., the Y-axis direction), is further formed in the storage area AR. The middle common electrode MCOM is formed in parallel with the data line in each storage area AR not having the data line and minimizes a deviation of the common voltage Vcom depending on a position in the pixel array.

A first branch pixel electrode BRPXL1 in the storage area AR may be formed under the middle common electrode MCOM with a gate insulating layer GI interposed therebetween and may be formed on the same level layer as the lower common electrode DCOM. A second branch pixel electrode BRPXL2 in the storage area AR may be formed under the middle common electrode MCOM with the gate insulating layer GI interposed therebetween and may be formed on the same level layer as the lower common electrode DCOM.

The first and second branch pixel electrodes BRPXL1 and BRPXL2 may be formed using the same material and the same process as the lower common electrode DCOM, the gate lines GL1 and GL2, the gate electrodes of the TFTs, etc. The lower common electrode DCOM is formed in parallel with the gate lines GL1 and GL2 along the horizontal direction, but does not extend along the vertical direction in the storage area AR unlike FIG. 9. The first branch pixel electrode BRPXL1 is formed in the storage area AR, so that it overlaps the middle common electrode MCOM. The first branch pixel electrode BRPXL1 may be connected to the first pixel electrode UPXL1 through a 1-2 contact hole CT12. The second branch pixel electrode BRPXL2 is formed in the storage area AR, so that it overlaps the middle common electrode MCOM. The second branch pixel electrode BRPXL2 may be connected to the second pixel electrode UPXL2 through a 2-2 contact hole CT22. The middle common electrode MCOM may be formed using the same material and the same process as the data lines DL1 and DL2, the source electrodes S and the drain electrodes D of the TFTs, etc. The upper common electrode UCOM may be formed using the same material and the same process as the first and second pixel electrodes UPXL1 and UPXL2. The upper common electrode UCOM may be positioned opposite the first and second pixel electrodes UPXL1 and UPXL2 and also may extend along the vertical direction (i.e., the Y-axis direction) in the storage area AR. The lower common electrode DCOM, the middle common electrode MCOM, and the upper common electrode UCOM are connected to one another through 1-3 and 2-3 contact holes CT13 and CT23.

Hence, the first storage capacitor Cst1 may use the first branch pixel electrode BRPXL1 and the middle common electrode MCOM as both electrodes, and the second storage capacitor Cst2 may use the second branch pixel electrode BRPXL2 and the middle common electrode MCOM as both electrodes.

The first and second branch pixel electrodes BRPXL1 and BRPXL2 may be asymmetrically formed in the storage area AR, so as to maximally suppress an influence of an interference of an electric field applied from an adjacent pixel. In other words, as shown in FIGS. 15 and 16, the first branch pixel electrode BRPXL1 may be positioned closer to the first pixel electrode UPXL1 than to the second pixel electrode UPXL2, and the second branch pixel electrode BRPXL2 may be positioned closer to the second pixel electrode UPXL2 than to the first pixel electrode UPXL1.

As described above, the embodiments of the invention form the storage capacitor in the storage area (e.g., not having the data line) between the pixels, which are positioned adjacent to each other in the horizontal direction, thereby increasing the capacitance of the storage capacitor. Further, the embodiments of the invention can reduce the formation area of the storage capacitor in consideration of the increased capacitance of the storage capacitor and can minimize a reduction in the aperture ratio resulting from the storage capacitor.

Furthermore, the embodiments of the invention form the branch pixel electrode serving as one electrode of the storage capacitor close to a pixel, to which the branch pixel electrode belongs, so that the branch pixel electrode is least affected by the interference of the electric field of an adjacent pixel. Hence, the voltage hold strength can greatly increase.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A pixel array of a liquid crystal display, the pixel array comprising:
    a first pixel including a first pixel electrode chargeable to a first data voltage, an upper common electrode which is positioned opposite the first pixel electrode and arranged to form an electric field, a lower common electrode arranged to apply a common voltage to the upper common electrode, and a first storage capacitor for holding the first data voltage during a predetermined period; and
    a second pixel including a second pixel electrode chargeable to a second data voltage, the upper common electrode which is positioned opposite the second pixel electrode and arranged to form the electric field, the lower common electrode arranged to apply the common voltage to the upper common electrode, and a second storage capacitor for holding the second data voltage during a predetermined period,
    wherein the first and second storage capacitors are located in an area between the first and second pixels, which are positioned adjacent to each other in a direction parallel to the gate lines,
    wherein the gate lines and data lines for driving the first and second pixels are not located in the area between the first and second pixels, and
    wherein the upper common electrode is positioned on a same level layer as the first and second pixel electrodes, and the lower common electrode is positioned on a same level layer as the gate lines.

2. The pixel array of the liquid crystal display of claim 1, wherein the first storage capacitor includes a first branch pixel electrode branching out from the first pixel electrode as one electrode, and the second storage capacitor includes a second branch pixel electrode branching out from the second pixel electrode as one electrode.

3. The pixel array of the liquid crystal display of claim 2, wherein the first branch pixel electrode is located on the lower common electrode with a first insulating layer interposed therebetween and is located under the upper common electrode with at least one second insulating layer interposed therebetween, and
    wherein the second branch pixel electrode is located on the lower common electrode with the first insulating layer interposed therebetween and is located under the upper common electrode with the at least one second insulating layer interposed therebetween.

4. The pixel array of the liquid crystal display of claim 3, wherein the first storage capacitor includes a first upper storage capacitor using the first branch pixel electrode and the upper common electrode as electrodes, and a first lower storage capacitor using the first branch pixel electrode and the lower common electrode as electrodes, and
    wherein the second storage capacitor includes a second upper storage capacitor using the second branch pixel electrode and the upper common electrode as electrodes, and a second lower storage capacitor using the second branch pixel electrode and the lower common electrode as electrodes.

5. The pixel array of the liquid crystal display of claim 2, wherein a middle common electrode, which is connected to the upper common electrode and the lower common electrode and extends in a direction parallel to the data lines, is located in the storage area.

6. The pixel array of the liquid crystal display of claim 5, wherein the first branch pixel electrode is located under the middle common electrode with a first insulating layer interposed therebetween and is located on the same level layer as the lower common electrode,
wherein the second branch pixel electrode is located under the middle common electrode with the first insulating layer interposed therebetween and is located on the same level layer as the lower common electrode,
wherein the first storage capacitor includes the first branch pixel electrode and the middle common electrode, and
wherein the second storage capacitor includes the second branch pixel electrode and the middle common electrode.

7. The pixel array of the liquid crystal display of claim 5, wherein the first and second branch pixel electrodes are located on a same level layer as the lower common electrode and the gate lines, and the middle common electrode is located on a same level layer as the data lines.

8. The pixel array of the liquid crystal display of claim 2, wherein the first branch pixel electrode and the second branch pixel electrode are asymmetrically located in the storage area.

9. The pixel array of the liquid crystal display of claim 8, wherein the first branch pixel electrode is positioned closer to the first pixel electrode than to the second pixel electrode in the storage area, and
wherein the second branch pixel electrode is positioned closer to the second pixel electrode than to the first pixel electrode in the storage area.

10. The pixel array of the liquid crystal display of claim 2, wherein at least one of the upper common electrode and the lower common electrode is divided into two or more electrode patterns in the storage area and adjusts capacitances of the first and second storage capacitors.

11. The pixel array of the liquid crystal display of claim 2, wherein two common electrodes extend along a direction parallel to the data lines in the area between the first and second pixels.

12. The pixel array of the liquid crystal display of claim 11, wherein the first storage capacitor uses the first branch pixel electrode and at least one of the two common electrodes as electrodes, and
wherein the second storage capacitor uses the second branch pixel electrode and the at least one of the two common electrodes as electrodes.

13. The pixel array of the liquid crystal display of claim 2, wherein the first and second branch pixel electrodes are located on a same level layer as the data lines.

14. The pixel array of the liquid crystal display of claim 1, wherein two or more pixels adjacent to each other in the direction parallel to the gate lines share a same data line in a time-divisional manner.

15. A pixel array of a liquid crystal display, the pixel array comprising:
a first pixel including a first pixel electrode chargeable to a first data voltage, an upper common electrode which is positioned opposite the first pixel electrode and arranged to form an electric field, a lower common electrode arranged to apply a common voltage to the upper common electrode, and a first storage capacitor for holding the first data voltage during a predetermined period; and
a second pixel including a second pixel electrode chargeable to a second data voltage, the upper common electrode which is positioned opposite the second pixel electrode and arranged to form the electric field, the lower common electrode arranged to apply the common voltage to the upper common electrode, and a second storage capacitor for holding the second data voltage during a predetermined period,
wherein the first and second storage capacitors are located in an area between the first and second pixels, which are positioned adjacent to each other in a direction parallel to gate lines,
wherein the gate lines and data lines for driving the first and second pixels are not located in the area between the first and second pixels,
wherein the first storage capacitor includes a first branch pixel electrode branching out from the first pixel electrode as one electrode, and the second storage capacitor includes a second branch pixel electrode branching out from the second pixel electrode as one electrode,
wherein a middle common electrode, which is connected to the upper common electrode and the lower common electrode and extends in a direction parallel to the data lines, is located in the storage area,
wherein the first branch pixel electrode is located under the middle common electrode with a first insulating layer interposed therebetween and is located on the same level layer as the lower common electrode,
wherein the second branch pixel electrode is located under the middle common electrode with the first insulating layer interposed therebetween and is located on the same level layer as the lower common electrode,
wherein the first storage capacitor includes the first branch pixel electrode and the middle common electrode, and
wherein the second storage capacitor includes the second branch pixel electrode and the middle common electrode.

* * * * *